(12) United States Patent
Sakaguchi

(10) Patent No.: US 11,178,297 B2
(45) Date of Patent: Nov. 16, 2021

(54) DISPLAY CONTROL DEVICE, DISPLAY CONTROL SYSTEM AND IMAGE FORMING APPARATUS

(71) Applicant: FUJIFILM Business Innovation Corp., Tokyo (JP)

(72) Inventor: Katsutoshi Sakaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/509,483

(22) Filed: Jul. 11, 2019

(65) Prior Publication Data

US 2020/0304658 A1    Sep. 24, 2020

(30) Foreign Application Priority Data

Mar. 22, 2019  (JP) .............................. JP2019-055506

(51) Int. Cl.
*H04N 1/00* (2006.01)

(52) U.S. Cl.
CPC ..... *H04N 1/00472* (2013.01); *H04N 1/00933* (2013.01)

(58) Field of Classification Search
None
See application file for complete search history.

(56) References Cited

U.S. PATENT DOCUMENTS

| 2006/0114257 | A1  | 6/2006  | Nishimi |
|--------------|-----|---------|---------|
| 2008/0170256 | A1* | 7/2008  | Matsuhara ............ G06F 3/1288 358/1.15 |
| 2015/0156074 | A1* | 6/2015  | Yamada ................. G06Q 50/01 700/275 |
| 2016/0350042 | A1* | 12/2016 | Suwabe ................ G06F 21/608 |
| 2017/0005969 | A1* | 1/2017  | Oshiba .................... H04L 51/16 |
| 2018/0329622 | A1* | 11/2018 | Missig .................. G06F 3/0219 |

FOREIGN PATENT DOCUMENTS

| JP | 2006-115353 | 4/2006 |
| JP | 2006-155369 | 6/2006 |

* cited by examiner

*Primary Examiner* — Frantz Bataille
(74) *Attorney, Agent, or Firm* — JCIPRNET

(57) ABSTRACT

A display control device includes: a management unit that manages a display time period when displaying each of a plurality of messages on a display device for each user; a setting unit that sets the display time period on the basis of an operation of a user; and a control unit that controls display of the message on the basis of the display time period managed by the management unit.

14 Claims, 16 Drawing Sheets

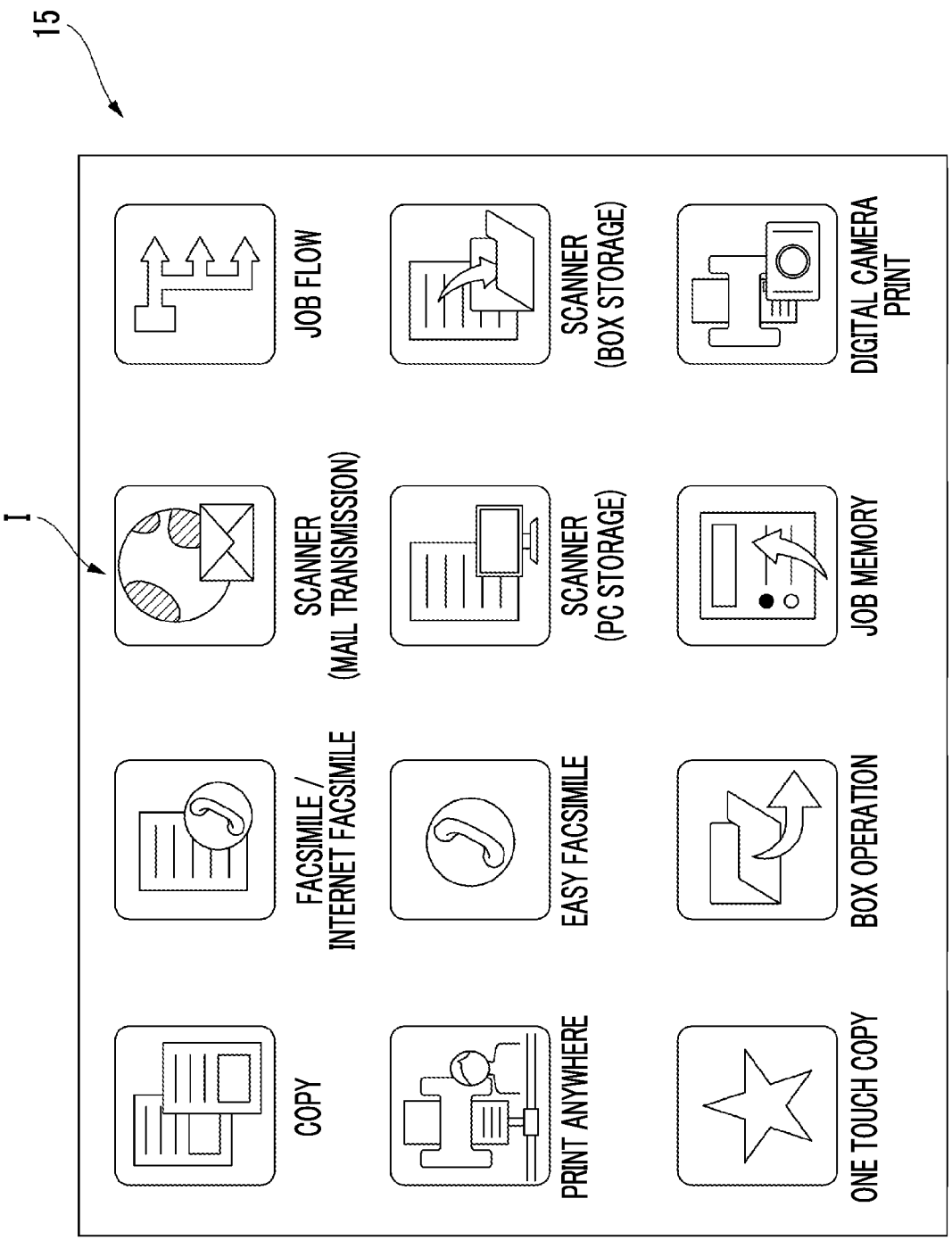

FIG. 11

| MESSAGE ID | USER ID | AUTOMATIC DELETION TIME PERIOD (SECONDS) |
|---|---|---|
| MSG00000001 | YAMADA_LV10 | 3 |
| MSG00000001 | AOKI_LV15 | 7 |
| MSG00000001 | TAKAI_L1 | 10 |
| MSG00000001 | - | 12 |
| MSG00000002 | YAMADA_LV10 | 5 |
| MSG00000002 | AOKI_LV15 | 10 |
| MSG00000002 | - | 10 |
| ... | ... | ... |

| WARNING ID | USER ID | WARNING TIME PERIOD (SECONDS) |
|---|---|---|
| KIK00000001 | YAMADA_LV10 | 10 |
| KIK00000001 | AOKI_LV15 | 17 |
| KIK00000001 | TAKAI_L1 | 20 |
| KIK00000001 | - | 25 |
| KIK00000002 | YAMADA_LV10 | 8 |
| KIK00000002 | AOKI_LV15 | 12 |
| KIK00000002 | - | 15 |
| ... | ... | ... |

DISPLAY CONTROL DEVICE, DISPLAY CONTROL SYSTEM AND IMAGE FORMING APPARATUS

CROSS-REFERENCE TO RELATED APPLICATIONS

This application is based on and claims priority under 35 USC 119 from Japanese Patent Application No. 2019-055506 filed Mar. 22, 2019.

BACKGROUND

(i) Technical Field

The present invention relates to a display control device, a display control system, and an image forming apparatus.

(ii) Related Art

In an apparatus such as an image forming apparatus that performs copying, scanning, and the like, an operation screen using a touch panel or the like may be provided in order for the user to operate the apparatus. Then, in order to assist the operation of the user on the operation screen, a message may be displayed by using the pop-up or the banner.

JP2006-155369A discloses a message display device for displaying a message on a display device capable of displaying a text string with a predetermined number of letters. The message display device comprises: a message data storage unit in which text string data of the message is stored for each language used; and a language selection unit that selects and sets a language used for message display. The message display device further comprises: a reading unit that reads out the text string data of the used language, which is set by the language selection unit, from the message data storage unit in a case of detecting a state for which message display is necessary; and a letter number counter unit that counts the number of letters of the read out text string data. The message display device further comprises: a calculation unit that calculates the display time period of the text string data by multiplying the number of letters by a constant determined for each language used; and a display control unit that displays the text string data on the display device and deletes the text string data displayed at the time at which the display time period has elapsed. JP2006-115353A discloses an image forming apparatus that displays a message. The image forming apparatus comprises a display control service module having a function of switching the display time period of each message in accordance with the length of a message to be displayed in a case where functions of facsimile, copy, scanner, and printer switches and displays a plurality of messages.

SUMMARY

On an operation screen of an apparatus such as an image forming apparatus, a message may be displayed by the pop-up, the banner, or the like in order to assist an operation of a user. This message is deleted after being displayed during a predetermined display time period. However, in a case where the display time period is constant, depending on the contents of the message, the user may not read the message within the display time period or may continue to display the message even though the message has already read. For this reason, the user may feel inconvenient.

Aspects of non-limiting embodiments of the present disclosure relate to a display control device or the like which makes it difficult for a user to feel inconvenient as compared with the case where a message is displayed on the operation screen during a constant display time period.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control device comprising: a management unit that manages a display time period when displaying each of a plurality of messages on a display device for each user; a setting unit that sets the display time period on the basis of an operation of a user; and a control unit that controls display of the message on the basis of the display time period managed by the management unit.

BRIEF DESCRIPTION OF THE DRAWINGS

Exemplary embodiment(s) of the present invention will be described in detail based on the following figures, wherein:

FIG. 2 is a diagram illustrating an example of an image displayed on an operation panel;

FIG. 11 is a diagram illustrating a message table for managing a display time period of the message in a storage unit;

FIG. 16 is a diagram illustrating a warning table for managing a warning time period.

DETAILED DESCRIPTION

Description of Overall Configuration of Image Forming Apparatus 10

Figure 1:
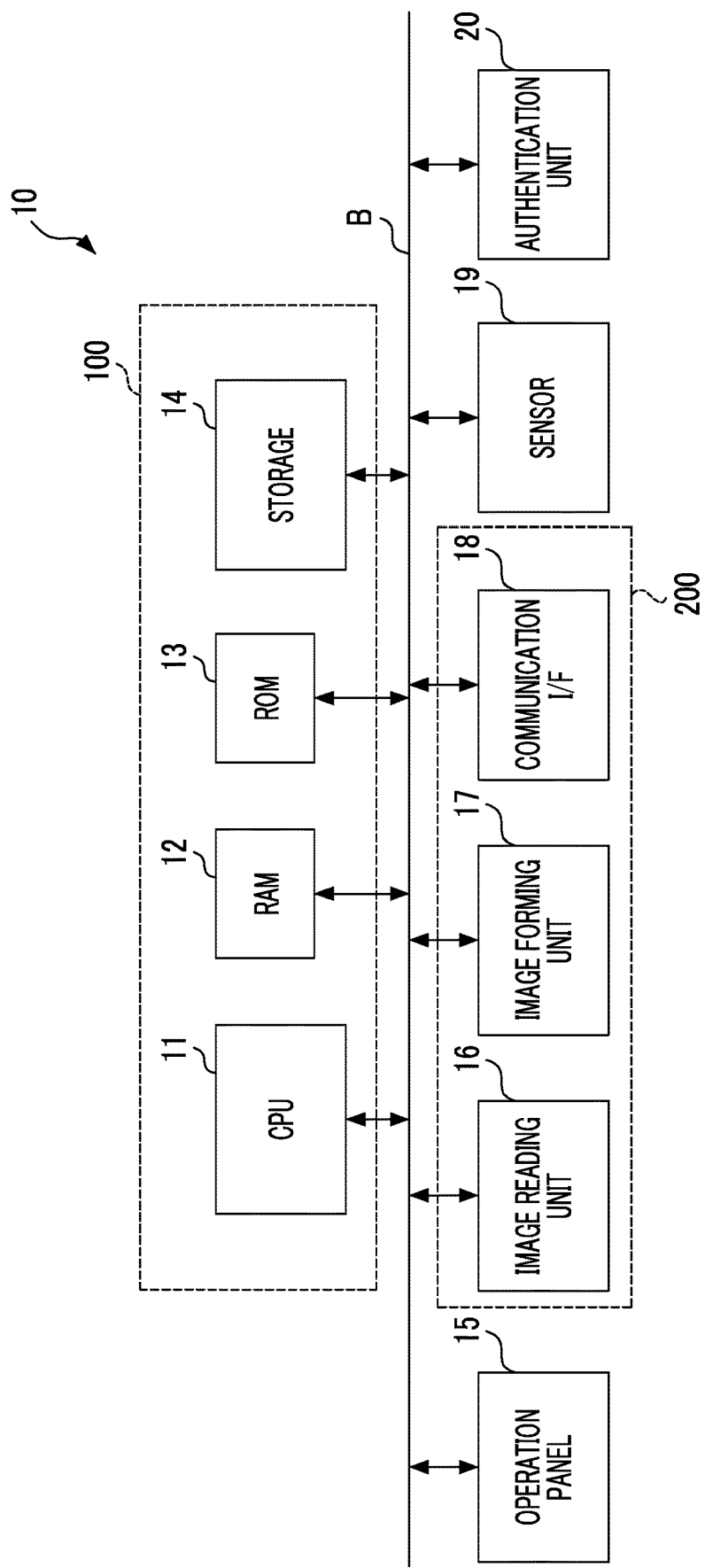
FIG. 1 is a diagram illustrating an example of a hardware configuration of an image forming apparatus.

FIG. 1 is a diagram illustrating an example of a hardware configuration of an image forming apparatus 10. The image forming apparatus 10 is an example of a display control system, and is an apparatus that forms an image on a recording material such as a sheet and outputs the image as a print medium. The image forming apparatus 10 has a printer function, but in addition to this, has other image processing functions such as a scanner function and a facsimile function.

As illustrated, the image forming apparatus 10 comprises a central processing unit (CPU) 11, a random access memory (RAM) 12, a read only memory (ROM) 13, a storage (hard disk drive) 14, an operation panel 15, an image reading unit 16, an image forming unit 17, a communication I/F 18, a sensor 19, and an authentication unit 20. Then, the components exchange necessary data through the bus B.

The CPU 11 implements various functions to be described later by loading various programs stored in the ROM 13 or the like into the RAM 12 and executing the programs.

The RAM 12 is a memory used as a working memory or the like of the CPU 11. The ROM 13 is a memory that stores various programs and the like executed by the CPU 11. The storage 14 stores image information, which is read by the image reading unit 16, and image information which is used for image formation of the image forming unit 17. The storage 14 is, for example, a magnetic disk device such as a hard disk drive (HDD) or a solid state drive (SSD). The operation panel 15 is an example of a display unit that displays information about the display device or the image forming apparatus. The operation panel 15 displays various kinds of information and accepts an operation input issued from a user. The operation panel 15 is, for example, a touch panel.

The image reading unit 16 is an example of a reading unit that reads an image of an original document, and reads an image recorded on the original document. Here, the image reading unit 16 is, for example, a scanner, and may employ an image reading unit using a CCD system or a CIS system. The CCD system is a system that reduces reflected light of light emitted onto the original document from the light source through a lens and receives the reflected light through charge coupled devices (CCD). The CIS system is a system that receives the reflected light of light, which is sequentially emitted onto the original document from a LED light source, through a contact image sensor (CIS).

The image forming unit 17 is an example of an image forming unit that forms an image on a recording material. Here, the image forming unit 17 is, for example, a printer, and may employ an image forming unit using an electrophotographic system that forms an image by transferring a toner attached to a photosensitive member onto a recording material such as a sheet or an inkjet system that forms an image by discharging an ink discharged onto the recording material. The communication I/F 18 transmits and receives various kinds of information to and from other devices through the network.

The sensor 19 detects various states occurring in the image forming apparatus 10. The sensor 19 detects, for example, whether or not a recording material or an original document is present. Further, jamming of the recording material is detected. Alternatively, the sensor 19 detects an operation performed by the user. For example, it is detected whether or not the tray containing the recording material is pulled out.

The authentication unit 20 is a device that authenticates a user. The authentication unit 20 is, for example, a card reader, and performs authentication by reading an ID card or the like possessed by the user. The authentication unit 20 is, for example, a near field communication (for example, NFC) device, performs wireless communication in a case where a user holds an ID card or the like possessed by the user, and performs authentication.

In the present embodiment, the image reading unit 16, the image forming unit 17, and the communication I/F 18 constitute a processing mechanism 200 that realizes the processing performed by the image forming apparatus 10. In the present embodiment, the CPU 11, the RAM 12, the ROM 13, and the storage 14 constitute a control unit 100 that controls the processing mechanism 200 of the image forming apparatus 10 as the own apparatus.

Description of Operation of Image Forming Apparatus 10

For example, a user is able to copy an original document by using such the image forming apparatus 10. That is, the original document is capable of being copied by forming the image on the recording material through the image forming unit 17 on the basis of the image information of the original document which is read by the image reading unit 16. The user is able to perform printing by transmitting a printing job to the image forming apparatus 10 from an external device (not illustrated) such as a personal computer (PC) through the communication I/F 18 and a network (not illustrated) such as a local area network (LAN) connected to the image forming apparatus 10. That is, printing is capable of being performed by forming the image on the recording material by the image forming unit 17 on the basis of the image information included in the printing job. In addition, the user is able to perform sending and receiving of facsimiles. That is, the image information of the original document, which is read by the image reading unit 16, is capable of being transmitted through the network and the communication I/F 18. Alternatively, the user is able to perform scanning of the original document. That is, the image information of the original document, which is read by the image reading unit 16, is capable of being stored in the external device through the network and the communication I/F 18.

Description of Operation Panel 15

Next, the operation panel 15 will be described in more detail. The operation panel 15 is, for example, a touch panel as described above. By using the operation panel 15 as a touch panel, the touch panel displays various kinds of information such as image forming conditions of the image forming apparatus 10. Then, the user performs input operations of image forming conditions and the like by touching the touch panel. Further, a start button may be provided to start the above-mentioned processing such as copying. Furthermore, in the operation panel 15, a message for assisting the user operation, such as a guide for explaining functions or a prohibition upon setting of the functions, is displayed as a display element. Hereinafter, this configuration will be described in more detail.

For example, the operation panel 15 operates as follows. FIG. 2 is a diagram illustrating an example of an image displayed on the operation panel 15. In such a case, the operation panel 15 displays a list of icons I, which are for executing the functions of the image forming apparatus 10, as an image. The image is a so-called home screen. Further, the icon I displayed at this time is associated with predetermined processing, and the processing is performed by selecting the icon I.

In the illustrated example, the operation panel 15 displays the icons I indicating the respective functions of copy, facsimile/internet facsimile, scanner (mail transmission), job flow, print anywhere, easy facsimile, scanner (PC storage), scanner (box storage), one touch copy, box operation, job memory, and digital camera print, and lists the icons I.

Then, the user performs a selection operation for selecting any of the icons in order to use the target function. The selection operation is, for example, an operation in which a user touches the icon I. In a case where the user touches the icon I, for example, a setting screen corresponding to the function associated with the icon I is displayed. For example, in a case where the icon I of "COPY" is touched, a screen for setting the number of copies, selection of sheets to be used, selection of monochrome/color, and setting of enlargement/reduction is displayed as a setting screen for copying an original document. In a case where the user presses a start button (not illustrated) or the like after setting, an actual copy operation is started.

In a case where the user's attention is called, that is, in a case where the user is warned, or in a case where the user is guided, a different image may be superimposed and displayed on the screen on the operation panel 15. This different image is, for example, a banner.

Figure 3A:
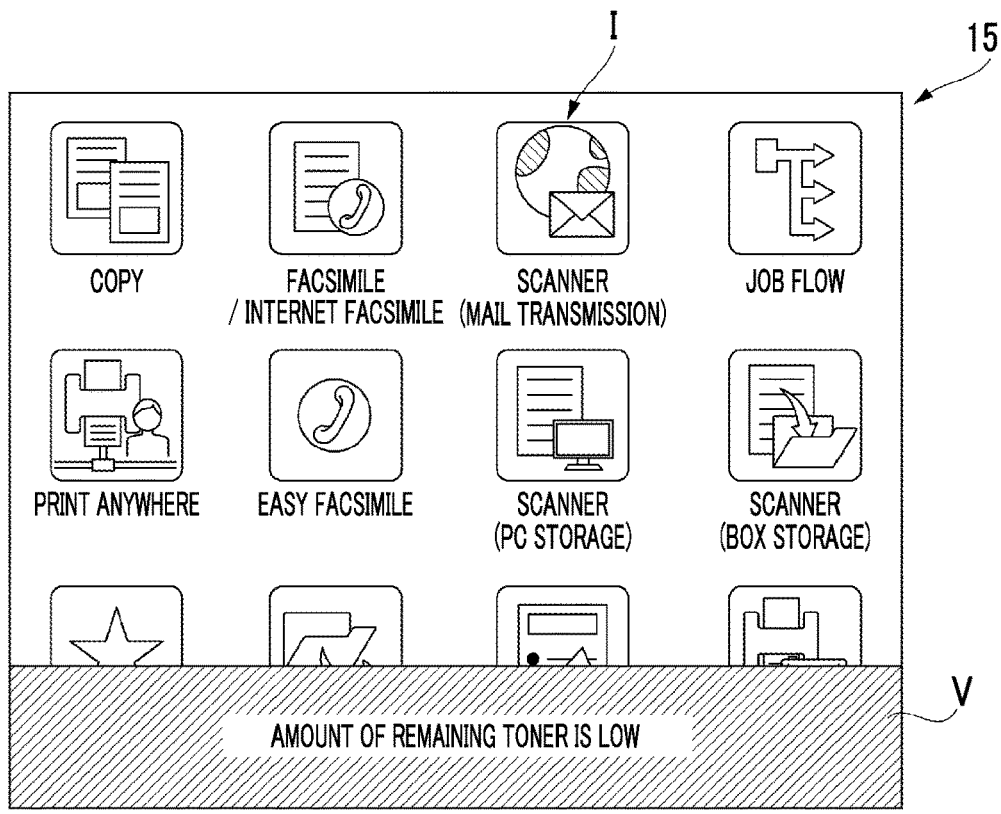
FIGS. 3A and 3B are diagrams illustrating an example in a case where a banner is displayed on a home screen illustrated in FIG. 2.
Figure 3B:
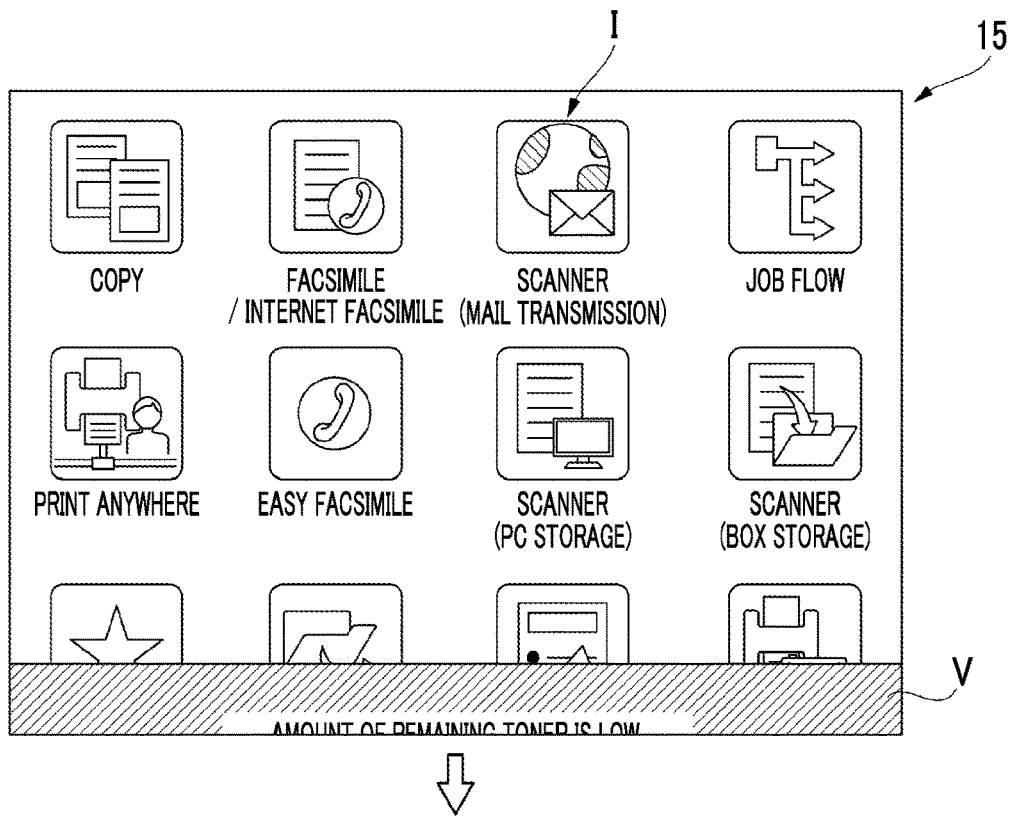

FIGS. 3A and 3B are diagrams illustrating an example in a case where a banner is displayed on a home screen illustrated in FIG. 2. The example of FIG. 3A illustrates an example in which a banner V is displayed in the lower part of the home screen (first image). As described above, in the present embodiment, in a case of displaying a message such as the banner V, the message is displayed in a state where the message is superimposed on an image such as the home screen. That is, in a case of displaying a message, the message is displayed in a superimposed state on an image such as the home screen.

In the example of FIG. 3A, the banner V indicating that "the amount of remaining toner is low" is displayed as a warning to the user.

In such a case, once the banner V is displayed in the lower part of the home screen, an operation for changing the display is performed after a predetermined time period has elapsed. Here, the banner V is not displayed while an animation operation is performed. Further, likewise, in a case where the user confirms the content of the banner V and performs a confirmation operation such as touching of the banner V, the banner V is not displayed while the animation operation is performed.

At this time, the banner V is not displayed by performing the animation operation such that the banner V slides and moves toward the lower side of the home screen after being displayed in the lower part of the home screen as illustrated in FIG. 3A and is hidden outside the home screen. FIG. 3B illustrates a state in which the animation operation is being performed. Then, in a case where the banner V is completely hidden outside the home screen, the normal home screen of FIG. 2 is returned. Here, the case where the banner V is not displayed by performing the animation operation is illustrated. However, the banner V may be not displayed without the animation operation. Further, although the banner V is displayed in the lower part of the home screen here, the screen to be displayed may be any screen other than the home screen. Furthermore, the position of the banner V is not limited to the lower part, and may be anywhere. Here, the confirmation operation is performed by touching the banner V. However, the banner V may be deleted by separately providing a close button and pressing the close button. Furthermore, although the case where the banner V is displayed is illustrated here, the form of the display is not particularly limited. For example, pop-up display may be used.

As described above, in a case where the message is displayed by being superimposed on the display element for receiving input in the form of the banner V or pop-up, the user is unable to operate the input unit such as the icon in a part covered by the display element for the superimposed message among the display elements for receiving inputs on the lower side. In this example, in a case where the banner V is displayed in the lower part of the home screen as illustrated in FIG. 3A, some of the icons I arranged in the lowermost row among the icons I displayed on the home screen are hidden. In addition, what is hidden is not limited to the icons I, and may be, for example, a menu. Therefore, the icon I in the covered part or the like is capable of being operated by deleting the display element for the message in a case where a predetermined time period has elapsed from the start of display or in a case where the delete button in the display element is pressed. Depending on the contents of the message, the user is unable to read the message within the deletion time period and thus has to perform the same operation again. On the contrary, in a case where the display time period is long, each time after the delete button is pressed, it is necessary to perform the next user operation. Therefore, the user may feel bothered by the message.

Therefore, in the present embodiment, in a case where the banner V or the like is displayed, the deletion time period is set to be variable for each of the contents of the message display, and the banner V is automatically deleted at the time at which the device determines that the user completes reading the message. Thereby, the above-mentioned problem is prevented from occurring. The configuration of the control unit 100 for implementing the above-mentioned method will be described below.

Description of Control Unit 100

Figure 4:
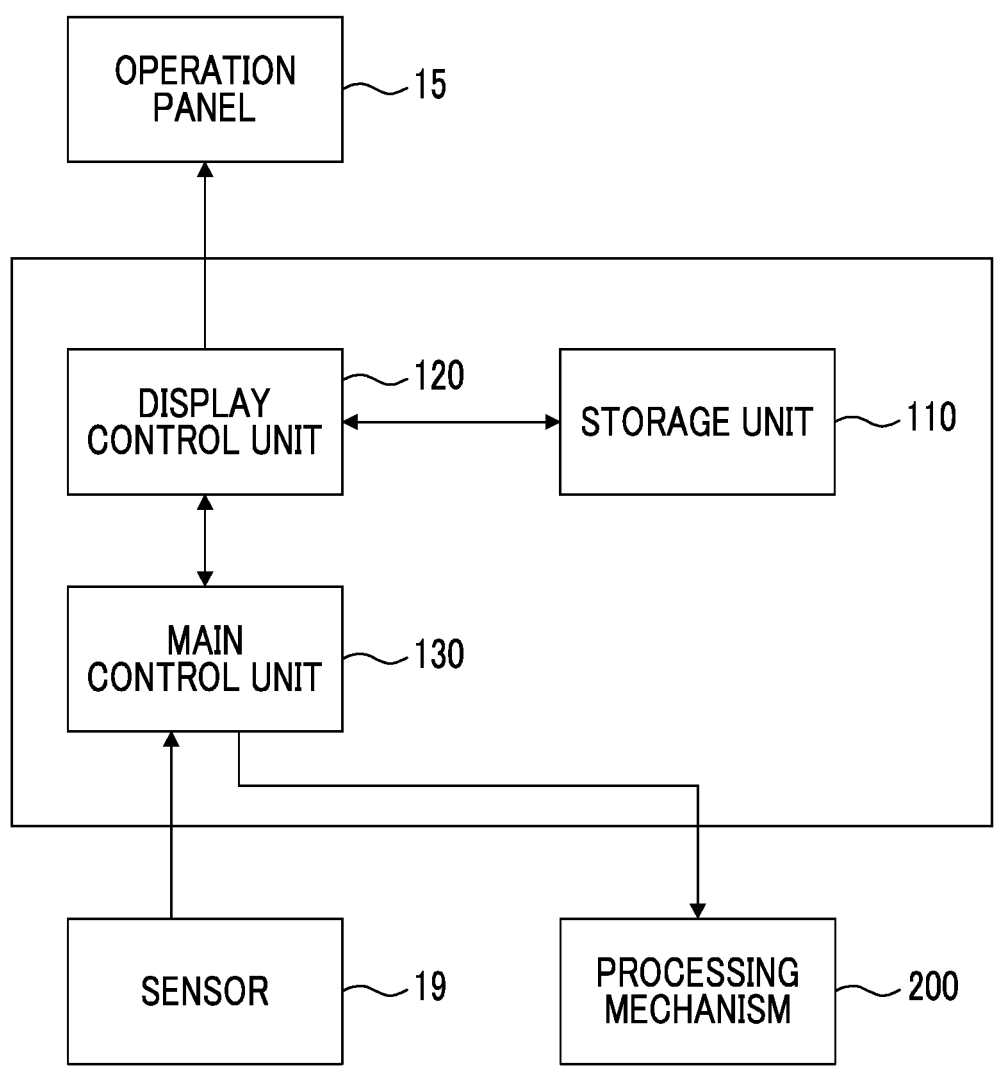
FIG. 4 is a block diagram illustrating an example of a functional configuration of a control unit.

FIG. 4 is a block diagram illustrating an example of a functional configuration of the control unit 100. In FIG. 4, among the various functions of the control unit 100, the functions relating to the present embodiment are selected and illustrated. In the present embodiment, the control unit 100 is an example of a display control device that controls display of a message. As illustrated, the control unit 100 comprises a storage unit 110 that stores various kinds of information, a display control unit 120 that controls the display of the screen of the operation panel 15, and a main control unit 130 that controls the entire image forming apparatus 10.

The storage unit 110 is an example of a management unit, and manages the display time period when displaying each of a plurality of messages on the operation panel 15 for each user. In addition to the display time period, the storage unit 110 stores various kinds of information such as setting information of the image forming apparatus 10, image information, a user ID, and a password. The storage unit 110 is capable of being implemented by, for example, the RAM 12, the ROM 13, and the storage 14.

The display control unit 120 controls display of an image on the operation panel 15. That is, the display control unit 120 creates the image information of the image as described in FIGS. 2, 3A, and 3B. Then, the created image information is output, and the operation panel 15 displays the image as described in FIGS. 2, 3A, and 3B. The display control unit 120 is an example of a control unit, and controls display of a message on the basis of the display time period managed by the storage unit 110. That is, the display control unit 120 controls the display time period of the above-mentioned banner V and the like. Further, the display control unit 120 is an example of the setting unit, and sets a display time period on the basis of a user operation. The operation of the user is, for example, in a case where a confirmation operation such as touching of the banner V is performed. Although details will be described later, the operation of the user is in a case where a predetermined operation is performed on the processing mechanism 200 of the image forming apparatus 10. In such a case, the operation of the user is detected by the sensor 19 provided in the processing mechanism 200 of the image forming apparatus 10 and is sent to the display control unit 120.

The main control unit 130 outputs a control signal to the processing mechanism 200 of the image forming apparatus 10 and controls the processing mechanism 200, thereby controlling the entire image forming apparatus 10. For example, in the case of scan processing, the main control unit 130 controls the image reading unit 16 to perform reading processing of reading an image of an original document. Further, the main control unit 130 performs image processing and outputs image information after image processing. Further, for example, in the case of copy processing, the main control unit 130 controls the image reading unit 16 to perform reading processing of reading an image of an original document. Furthermore, the main control unit 130 performs image processing, sends the image information after image processing to the image forming unit 17, and controls the image forming unit 17 to perform printing. The display control unit 120 and the main control unit 130 is capable of being implemented by, for example, a CPU 11.

Next, the operation of the control unit 100 will be described in more detail. Here, the operation of the control unit 100 will be described for each of the first to third embodiments.

First Embodiment

In the first embodiment, a description will be given of the case of controlling display of a message on the basis of the time period of the operation when a user performs a predetermined operation on the processing mechanism 200 of the image forming apparatus 10. Further, hereinafter, a description will be given of an operation in a case of displaying a warning message through a banner V or the like due to run out of sheets when a user presses the start button to perform a job such as copying in the image forming apparatus 10.

Figure 5:
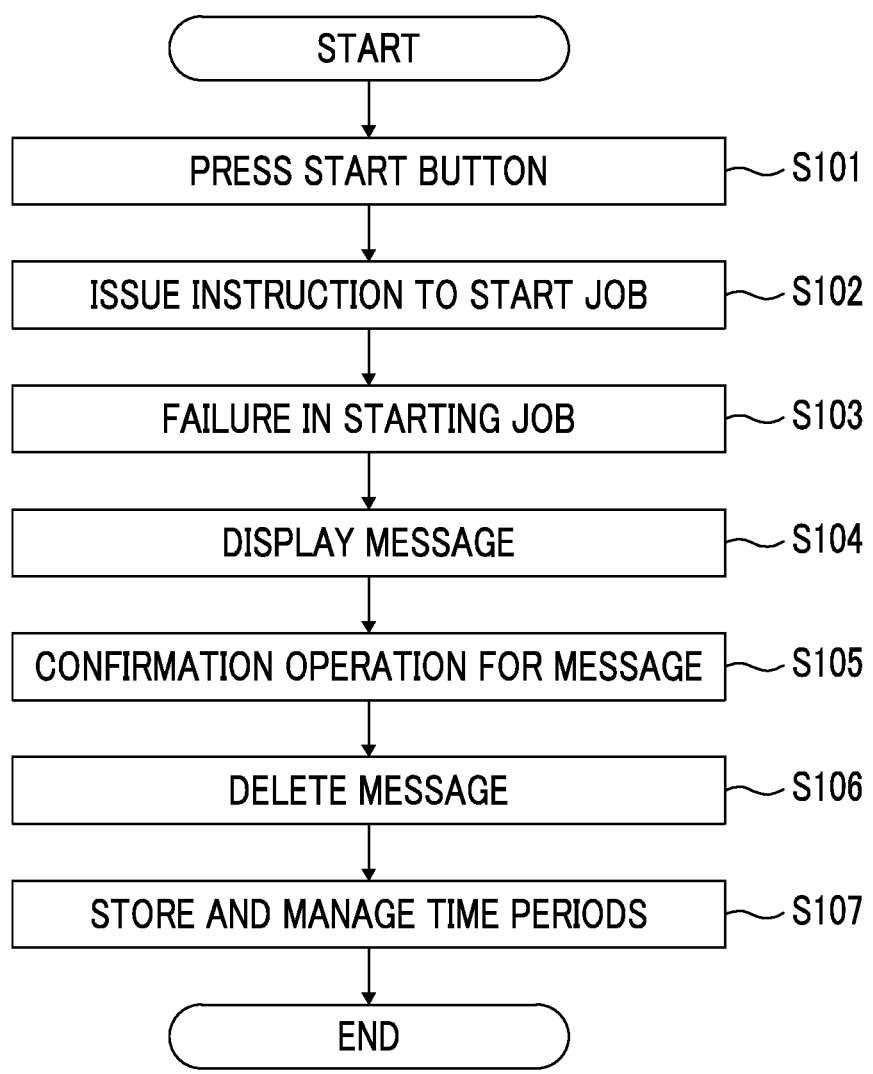
FIG. 5 is a flowchart explaining a first example of an operation of an image forming apparatus according to a first embodiment.
Figure 6:
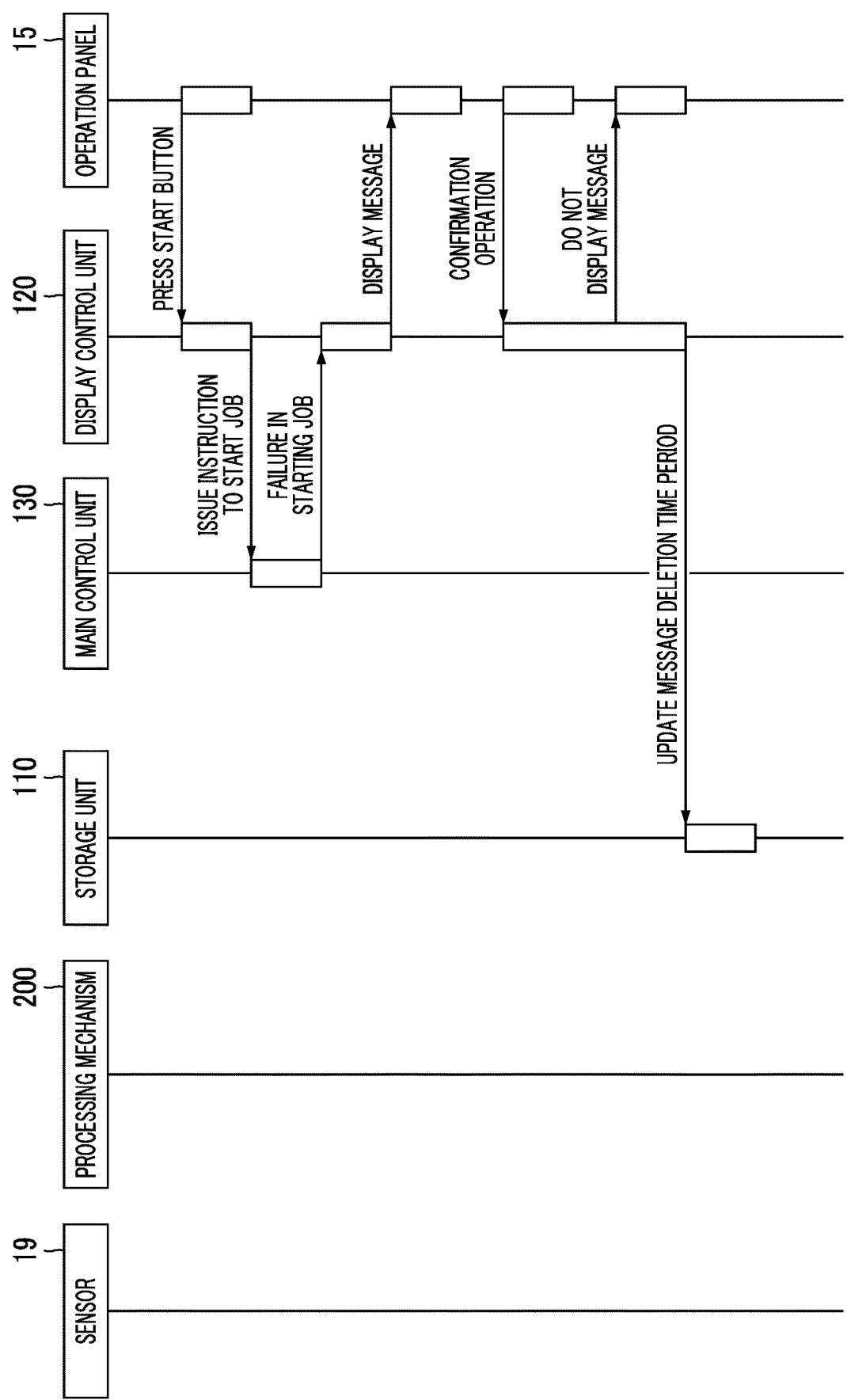
FIG. 6 is a sequence diagram explaining the first example of the operation of the image forming apparatus according to the first embodiment.

FIG. 5 is a flowchart explaining a first example of the operation of the image forming apparatus 10 according to the first embodiment. FIG. 6 is a sequence diagram explaining a first example of the operation of the image forming apparatus 10 according to the first embodiment. First, in order to perform a job such as copying, the user presses the start button on the operation panel 15 (step S101). Next, in response to the pressing of the start button, the display control unit 120 instructs the main control unit 130 to start the job (step S102).

At this time, in a case where the job such as copying is not capable of being started due to run out of sheets, the main control unit 130 is unable to start the job subjected to the instruction, and thus returns failure in starting the job to the display control unit 120 (step S103). Then, the display control unit 120 performs control for causing a control panel 15 to display a message to the effect that the job is not capable of being started with a cause of the effect (step S104). In such a case, for example, the banner V indicating that "The job is not capable of being executed due to run out of sheets. Please refill sheets." is displayed.

Next, the user operates the operation panel 15 to perform a confirmation operation for confirming the message (step S105) As described above, the confirmation operation is performed by touching the banner V or pressing the close button. In response to the confirmation operation of the user, the display control unit 120 deletes the banner V, which is the message, and does not display the banner V (step S106). As described above, in the first embodiment, the display control unit 120 deletes the message in a case where the user performs the predetermined operation. In addition, the display control unit 120 measures a time period until the user performs the confirmation operation after display of the banner V, stores the time period in the storage unit 110, and manages the time period (step S107).

Thereafter, for the user, the display time period for displaying the banner V indicating that "The job is not capable of being executed due to run out of sheets. Please refill sheets." is set as a time period measured by the display control unit 120.

Figure 7:
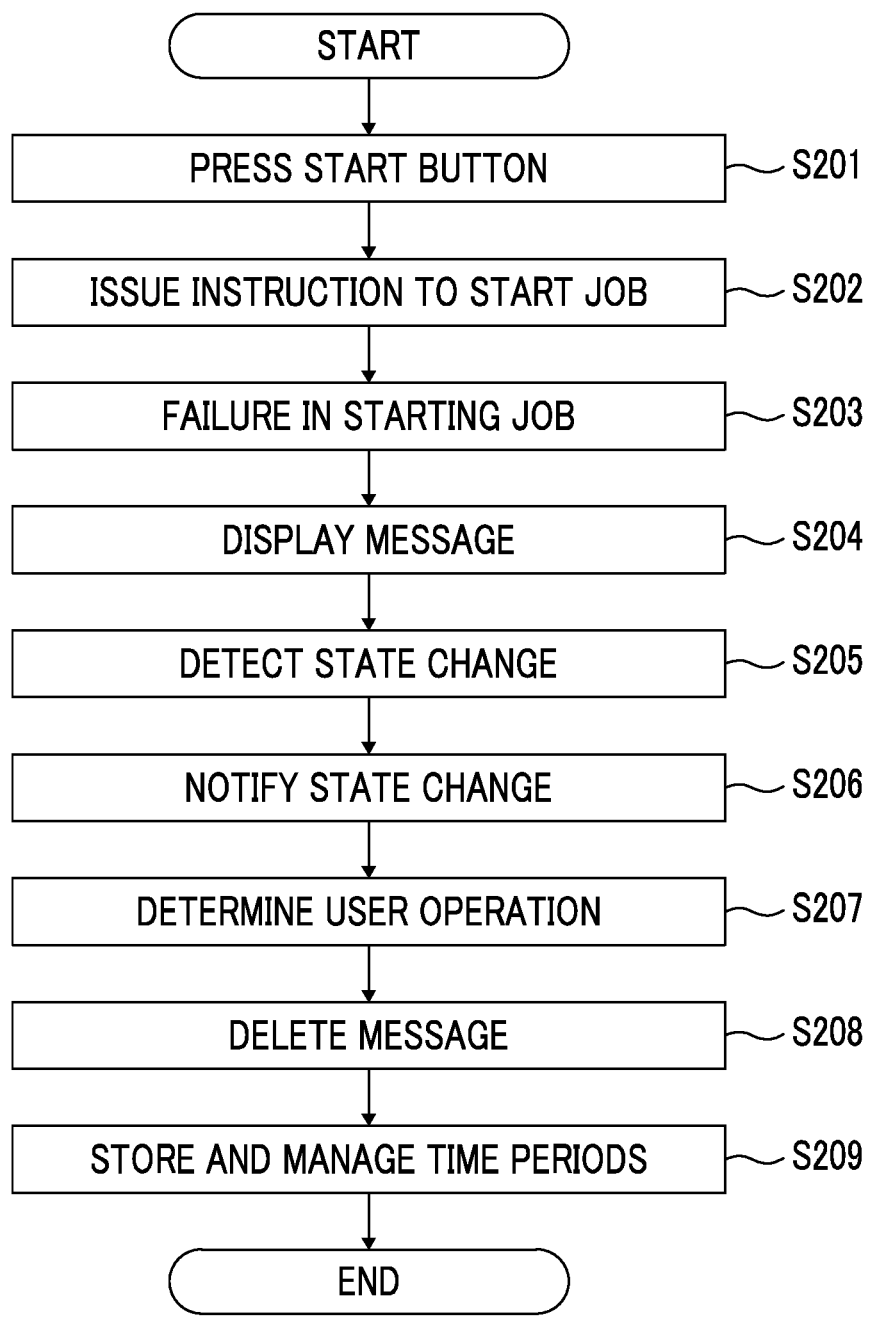
FIG. 7 is a flowchart explaining a second example of the operation of the image forming apparatus according to the first embodiment.
Figure 8:
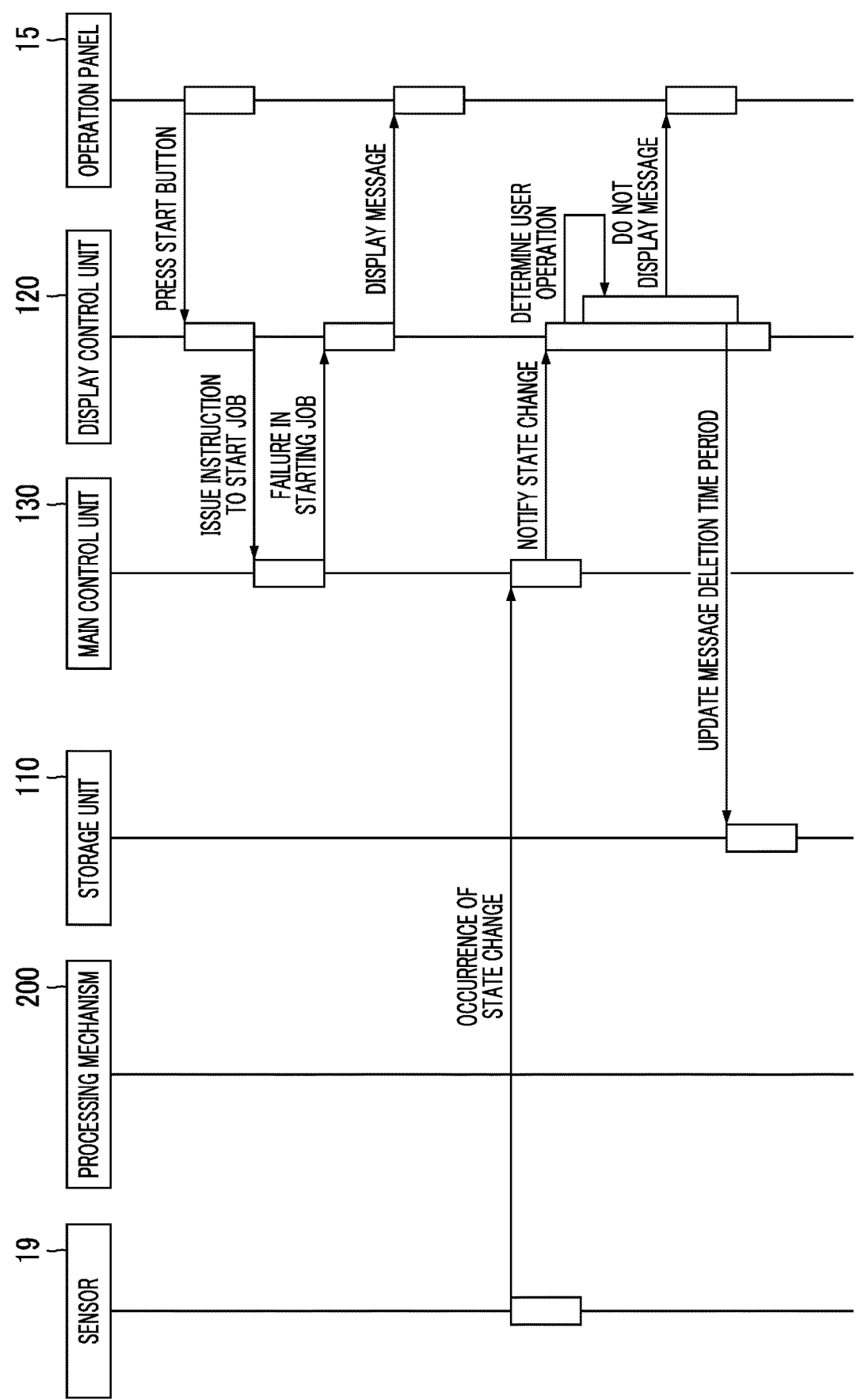
FIG. 8 is a sequence diagram explaining a second example of the operation of the image forming apparatus according to the first embodiment.

FIG. 7 is a flowchart explaining a second example of the operation of the image forming apparatus 10 according to the first embodiment. FIG. 8 is a sequence diagram explaining a second example of the operation of the image forming apparatus 10 according to the first embodiment. Here, since steps S201 to S204 are the same as steps S101 to S104 in FIG. 5, the description will be omitted. In and after the step S205, in a case where a state of the image forming apparatus 10 changes, the sensor 19 detects the state change and sends a detection signal to the main control unit 130 (step S205). In such a case, the state change is, for example, an operation in which the user pulls out the sheet cassette that contains sheets in order to refill sheets. The main control unit 130 notifies the display control unit 120 of the state change (step S206).

In such a case, the display control unit 120 that has received the notification determines that the operation in which the sheet cassette that contains sheets is pulled out is the result of the predetermined operation performed by the user (step S207), and the display control unit 120 deletes and does not display the banner V which is the message (step S208). Further, the display control unit 120 measures the time period until the user performs this operation after display of the banner V and the sensor 19 detects the operation, stores the time period in the storage unit 110, and manages the time period (step S209).

Figure 9:
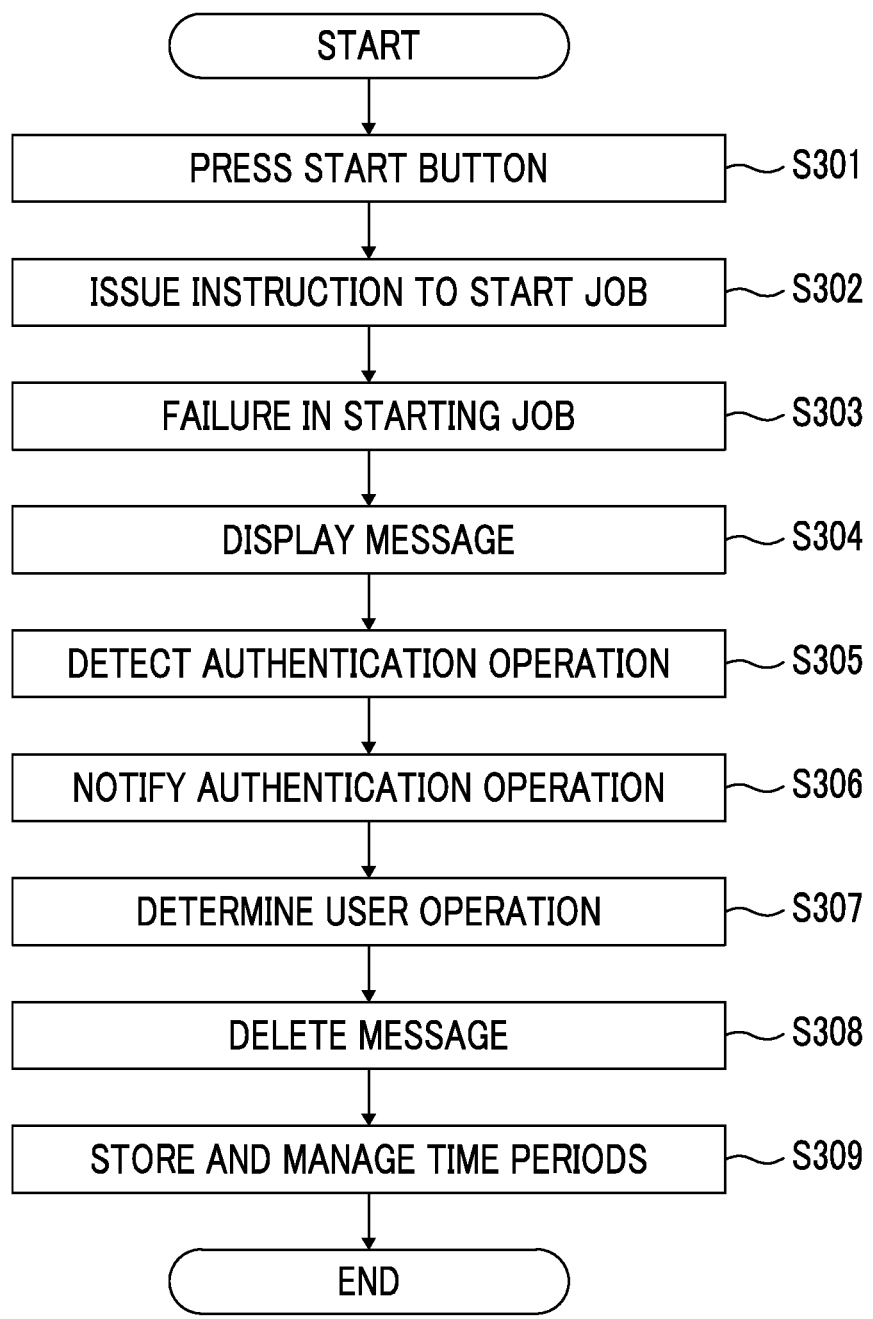
FIG. 9 is a flowchart explaining a third example of the operation of the image forming apparatus according to the first embodiment.
Figure 10:
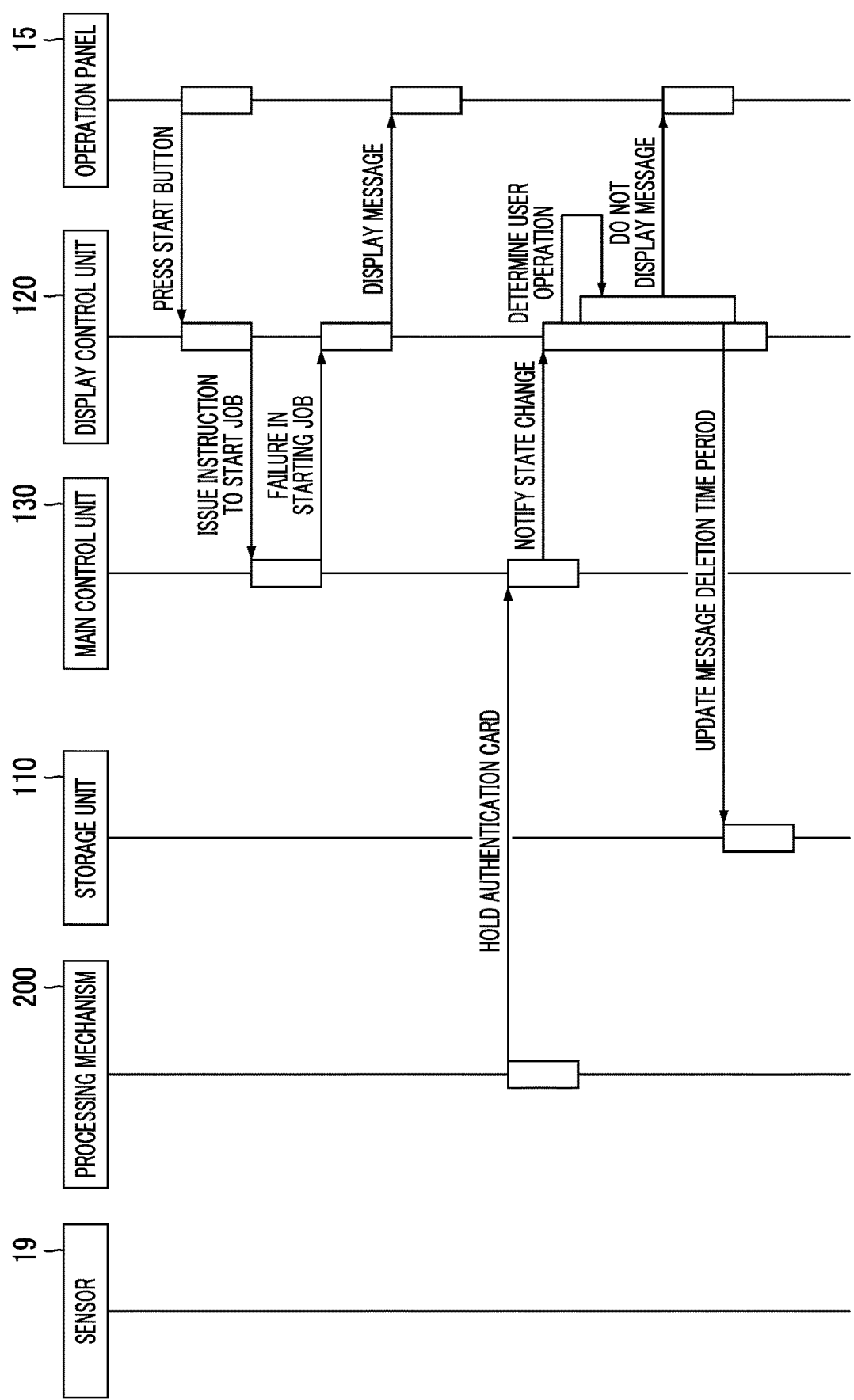
FIG. 10 is a sequence diagram explaining a third example of the operation of the image forming apparatus according to the first embodiment.

FIG. 9 is a flowchart explaining a third example of the operation of the image forming apparatus 10 according to the first embodiment. FIG. 10 is a sequence diagram explaining a third example of the operation of the image forming apparatus 10 according to the first embodiment. Here, since steps S301 to S304 are the same as steps S101 to S104 in FIG. 5, the description will be omitted. In and after step S305, in a case where the authentication unit 20 detects an authentication operation by the user, the authentication unit 20 sends a detection signal to the main control unit 130 (step S305). In such a case, the authentication operation is, for example, such an operation in which the user holds the ID card over the authentication unit 20. The main control unit 130 notifies the display control unit 120 of the authentication operation (step S306).

In such a case, the display control unit 120 that has received the notification determines that the authentication operation is the result of the predetermined operation performed by the user (step S307), and the display control unit 120 immediately deletes and does not display the banner V (step S308). Further, the display control unit 120 measures the time period until the user performs the authentication operation after display of the banner V and the authentication unit 20 detects the operation, stores the time period in the storage unit 110, and manages the time period (step S309).

FIG. 11 is a diagram illustrating a message table Tm for managing the display time period of the message in the storage unit 110. The illustrated message table Tm has the following data structure. That is, in the message table Tm, items of message IDs, user IDs, and automatic deletion time periods are set. Here, each message ID is an ID assigned to each message. Further, each user ID is an ID assigned to each user. In addition, each automatic deletion time period is the display time period of the message described above.

In the message table Tm, an automatic deletion time period is set for each message ID and each user ID. That is, the storage unit 110 manages the display time period for displaying each of a plurality of messages on the operation panel 15 for each user by using the message table Tm. For example, with respect to a message of which the message ID is MSG00000001, the automatic deletion time period is set to 3 seconds for a user of which the user ID is YAMADA LV10. In addition, the automatic deletion time period is set to 7 seconds for a user of which the user ID of the message ID is AOKI LV15.

In the message table Tm, the automatic deletion time period of an initial value is set for each message ID. In the illustrated message table Tm, the automatic deletion time period at each row of which the user ID is "-" is set as an initial value. The automatic deletion time period for the message of which the message ID is MSG00000001 is set to 12 seconds, and the automatic deletion time period for the message of which the message ID is MSG00000002 is set to 10 seconds. This time period is set, for example, depending on the length of the message, and is set to be longer as the message is longer and to be shorter as the message is shorter. Further, this time period is a display time period which is set in a case where the user first looks at the message. Furthermore, this time period is set as the longest time period which is set as a display time period for each message, and is set to become shorter than this predetermined longest time period as the user becomes more familiar with the message. On the other hand, the display time period is, for example, preferably set to be longer than a predetermined shortest time period. In other words, in consideration of the fact that it is difficult for the user to confirm the message in a time period shorter than the shortest time period, the time period is set, such that the user is less likely to miss confirmation of the message.

In the first embodiment, the display control unit 120 sets, as the display time period, a time period from when the display of the message is started to when the user performs a predetermined operation. This predetermined operation is a message confirmation operation in the first example. In the second example, the predetermined operation is an operation in which the user pulls out the sheet cassette. Further, in the third example, the predetermined operation is an operation in which the user holds the ID card over the authentication unit 20.

That is, since it is possible to detect that the user is able to confirm the display of the banner V within this time period, thereafter this time period may be set as the display time period. Thereby, the message is prevented from being continuously displayed for a long time period even after the user confirms the message. Further, even in a case where the user does not perform a confirmation operation such as a touch, the message is automatically deleted at an appropriate timing. That is, the user is less likely to feel bothered even in a case where the message is displayed.

The time period for the user to confirm the message is generally set to become shorter as the user becomes more familiar with the operation. In other words, first, it takes time to confirm the message, but the message often has similar patterns repeatedly. Thus, the user becomes familiar with the display of the message and sees the message many times. Therefore, the time period for confirmation is shortened. In the present embodiment, in a case where the message is displayed, the confirmation time period is updated for each user and managed by the storage unit 110. Then, in a case where the same message is displayed next, the message is displayed during the updated confirmation time period. Thereby, the display time period of the message is capable of being set in accordance with the degree of familiarity of the user. Then, in accordance with the degree of familiarity of the operation of the user, the confirmation time period is capable of being set to be shorter for each update. As a result, the user is less likely to feel bothered even in a case where the message is displayed.

Second Embodiment

In the second embodiment, a description will be given of a case where the display control unit 120 sets the display time period in accordance with the state of authentication of the user.

Figure 12:
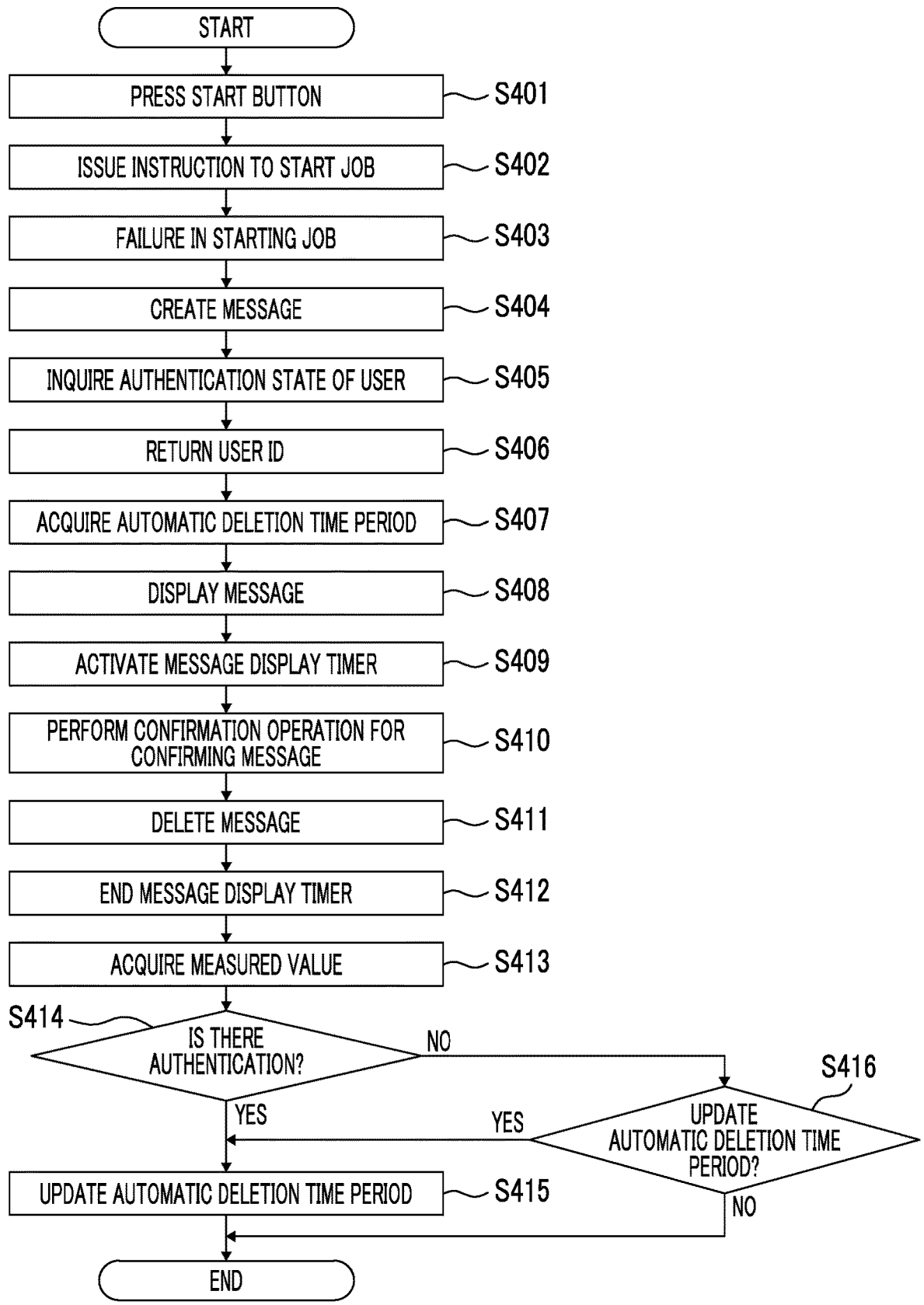
FIG. 12 is a flowchart explaining an operation of an image forming apparatus according to a second embodiment.
Figure 13:
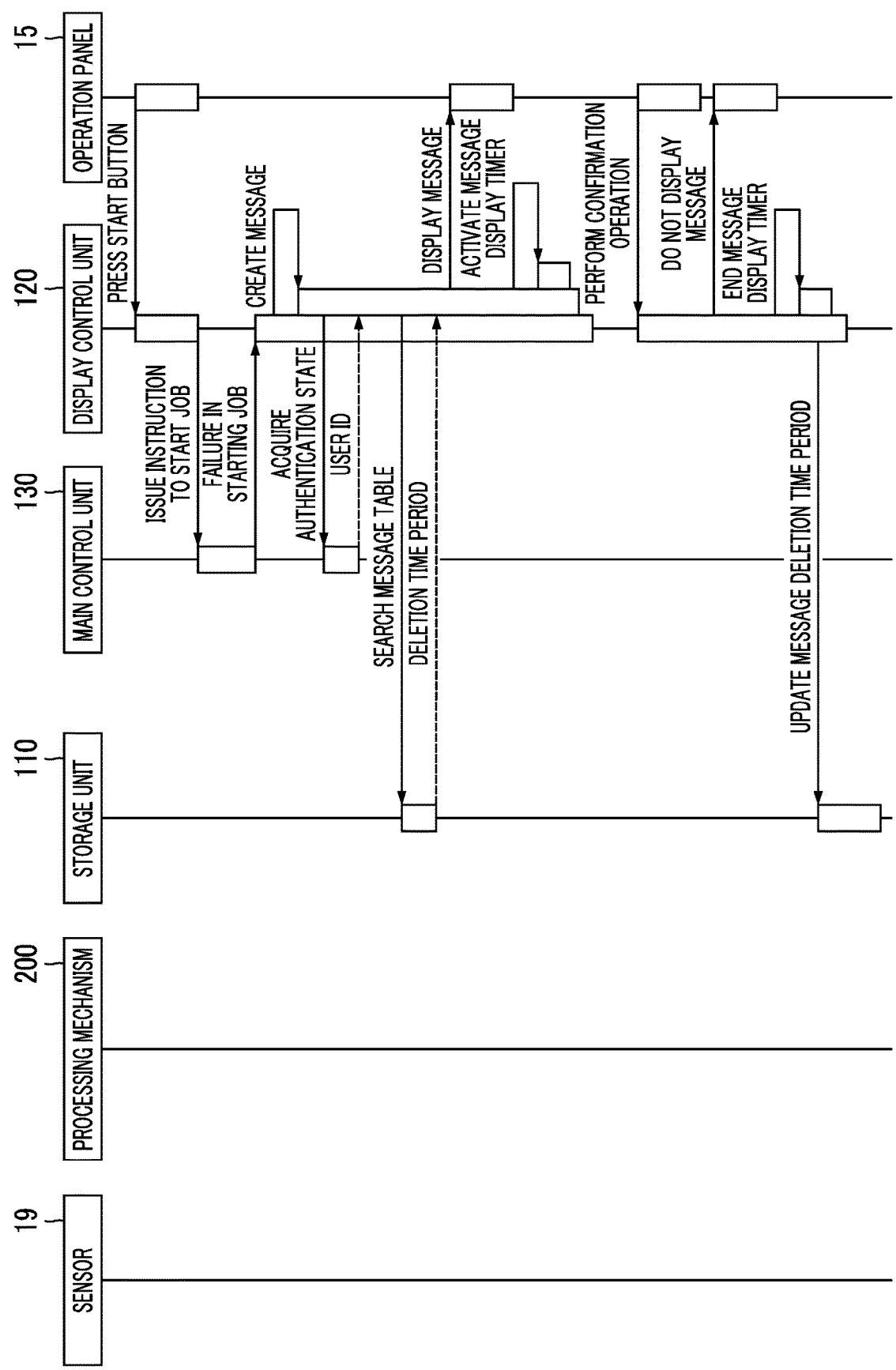
FIG. 13 is a sequence diagram explaining the operation of the image forming apparatus according to the second embodiment.

FIG. 12 is a flowchart explaining the operation of the image forming apparatus 10 according to the second embodiment. FIG. 13 is a sequence diagram explaining the operation of the image forming apparatus 10 according to the second embodiment. Here, since steps S401 to S403 are the same as steps S101 to S103 in FIG. 5, the description will be omitted. In and after step S404, the display control unit 120 creates a message (step S404). In such a case, for example, the banner V indicating that "The job is not capable of being executed due to run out of sheets. Please refill sheets." is displayed.

Next, the display control unit 120 inquires of the main control unit 130 about the state of authentication of the user (step S405). On the other hand, the main control unit 130 returns the authenticated user ID to the display control unit 120 (step S406). At this time, the main control unit 130 returns the user ID in a case where the user is performing authentication, but returns a result of non-authentication in a case where the user is not authenticated.

Then, referring to the storage unit 110, the display control unit 120 acquires the automatic deletion time period corresponding to the user ID acquired from the main control unit 130 and the message ID from the message table Tm as illustrated in FIG. 11 (step S407). In a case where the user is not authenticated, the main control unit 130 returns the automatic deletion time period of which the user ID is "-" in FIG. 11. That is, the automatic deletion time period at this time is the longest time period which is preset in each message. Then, in a case where the user is not authenticated, the display control unit 120 sets, as the display time period, the longest time period predetermined for each message. Next, the display control unit 120 displays the message created in step S404 (step S408). In such a case, the display control unit 120 displays the banner V on the operation panel 15.

Then, the display control unit 120 activates a message display timer (step S409). Next, the user operates the operation panel 15 to perform a confirmation operation for confirming the message (step S410). As described above, the confirmation operation is performed by touching the banner V or pressing the close button. In response to the confirmation operation of the user, the display control unit 120 deletes the banner V, which is the message, and does not display the banner V (step S411). Then, the display control unit 120 ends the message display timer (step S412), and acquires the measured value (step S413).

The display control unit 120 determines whether or not authentication is being performed on the basis of the state of authentication of the user (step S414). As a result, in a case where authentication is being performed (Yes in step S414), the automatic deletion time period in the storage unit 110 is updated with the measurement value of the message display timer (step S415). On the other hand, in a case where authentication is not being performed (No in step S414), the display control unit 120 determines whether or not to update the automatic deletion time period of which the user ID is "-" in FIG. 11 (step S416). The updating is performed, for example, in a case where the image forming apparatus 10 is used by one user and thus there is no problem even in a state where the automatic deletion time period of which the user ID set as the initial value is "-" changes. On the other hand, the updating is performed, for example, in a case where the image forming apparatus 10 is used by a plurality of users and thus there is a problem that the automatic deletion time period of which the user ID set as the initial value is "-" changes. As a result, in a case of updating, the processing proceeds to step S415. On the other hand, in a case where not updating, the series of processing ends. Thus, in the present embodiment, in a case where the user is authenticated, the display control unit 120 changes the display time period for displaying a message in storage unit 110. On the other hand, in a state where the user is not authenticated, the display control unit 120 determines whether or not to change the display time period.

As described above, in the second embodiment, the display control unit 120 sets the display time period in accordance with the state of authentication of the user. That is, in a case where the user is being authenticated, in the state where the user is not authenticated, the longest time period predetermined in each message is set as the display time period. Thereby, in the case of an unauthenticated user, it is assumed that the user is unfamiliar with the operation, and the longest predetermined time period is set as the display time period even for the unauthenticated user. In such a manner, it is possible to set the display time period appropriate for the user.

The display control unit 120 determines whether or not to change the display time period in a state where the user is not authenticated. For example, in a case where a plurality of people use the image forming apparatus 10 which is an apparatus to be authenticated, the display time period is not changed. In a case where one person uses the image forming apparatus 10, the display time period is changed. That is, in a case where a plurality of people use the image forming apparatus 10, there is a possibility that the plurality of people includes a user who is not familiar with the operation. However, in a case where one person uses the image forming apparatus 10, since there is no problem even in a case where the display time period is adjusted for this user and the display time period is changed, the display time period is changed.

The display control unit 120 may set the display time period in accordance with the frequency of authentication of the user. For example, the display control unit 120 sets the display time period in accordance with the period from the previous authentication of the user. That is, the more time period passes from the previous authentication of the user, the more often the user forgets to operate the image forming apparatus 10. Therefore, the display time period is changed as it is in a case where the predetermined time period has not elapsed from the previous authentication of the user. However, the magnitude of the change in the display time period is set to be smaller than the usual in a case where the predetermined time period has elapsed. Thereby, the display time period of the message is capable of being set in accordance with the degree of familiarity of the operation of the user. Further, the display time period may be set in accordance with the number of authentications within a predetermined period such as the last one month. In such a case, in a case where the number of authentications is greater than the predetermined number, the display time period is changed as it is. However, in a case where the number of authentications is equal to or less than the predetermined number, the magnitude of the change in the display time period is made to be smaller than the usual.

Third Embodiment

In the third embodiment, a description will be given of a case where a warning is issued as a message to the user. Here, a case where a warning is issued when the user forgets to take out an original document in the image reading unit 16 is exemplified, and a description will be given of a case where a warning time period until a warning is issued is managed.

Figure 14:
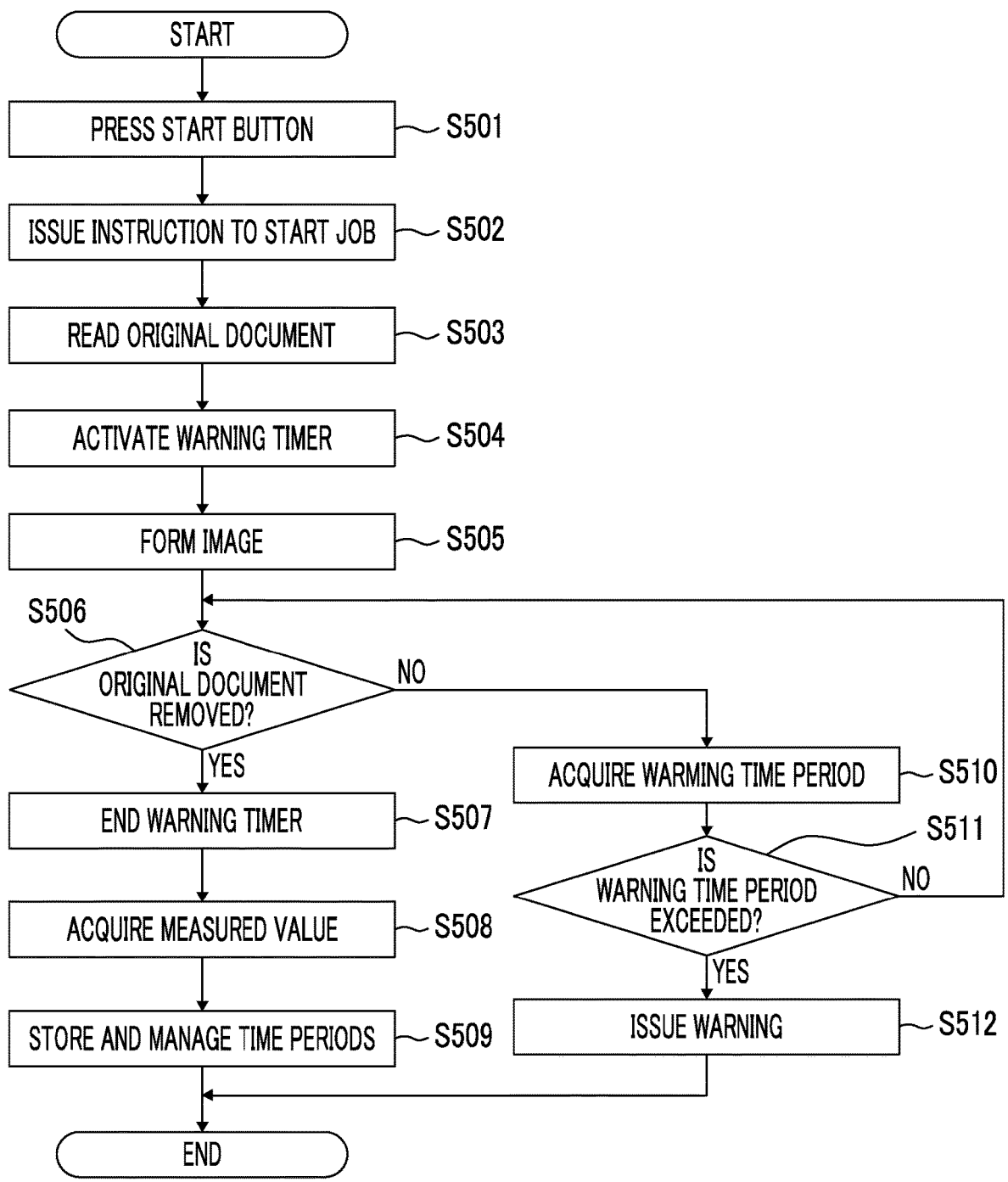
FIG. 14 is a flowchart explaining an operation of an image forming apparatus according to a third embodiment.
Figure 15:
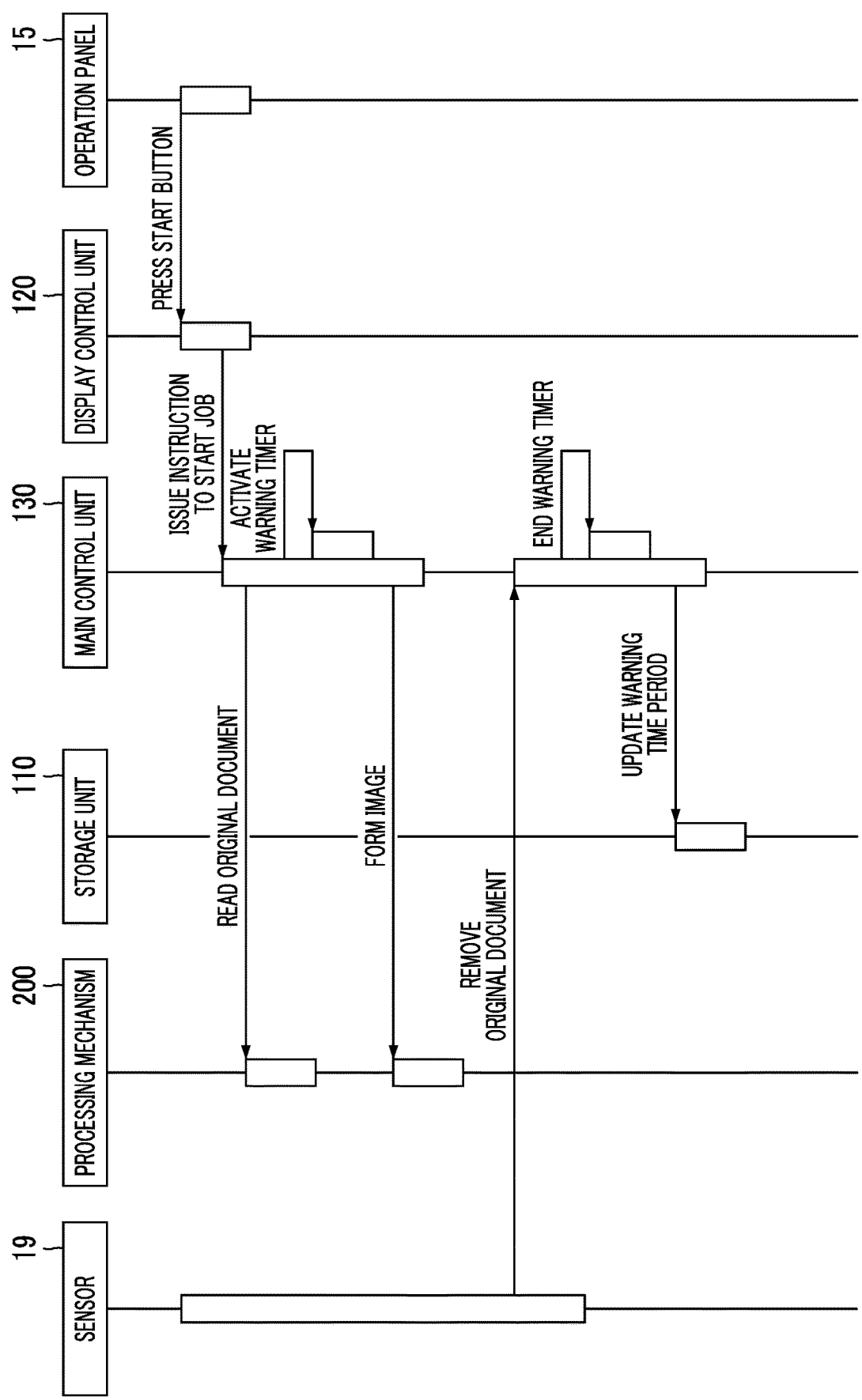
FIG. 15 is a sequence diagram explaining the operation of the image forming apparatus according to the third embodiment.

FIG. 14 is a flowchart explaining the operation of the image forming apparatus 10 according to the third embodiment. FIG. 15 is a sequence diagram explaining the operation of the image forming apparatus 10 according to the third embodiment. Here, since steps S501 and S502 are the same as steps S101 and S102 in FIG. 5, the description will be omitted. In and after step S503, the main control unit 130 operates the image reading unit 16 as the processing mechanism 200, thereby reading an original document (step S503). Then, in a case where the reading of the original document is completed, the main control unit 130 activates a warning timer (step S504). Further, the main control unit 130 operates the image forming unit 17 as the processing mechanism 200, thereby forming an image of the read original document (step S505).

Then, the main control unit 130 determines whether or not the original document is removed (step S506). Whether or not the original document is removed is capable of being determined from whether or not the sensor 19 detects a change in the state and a detection signal thereof is sent to the main control unit 130. As a result, in a case where the original document is removed (Yes in step S506), the main control unit 130 ends the warning timer (step S507), and acquires a measurement value (step S508). Further, the main control unit 130 causes the storage unit 110 to store, as the measurement value, the time period from when the reading of the original document is completed to when the original document is removed, and manages the time period as the warning time period (step S509). This management is performed with reference to a warning table Tk described below.

FIG. 16 is a diagram illustrating the warning table Tk for managing the warning time periods. In the warning table Tk, items of warning IDs, the user IDs, and the warning time periods are set. Each warning ID is an ID assigned to each warning. Further, each user ID is an ID assigned to each user. In addition, each warning time period is a time period until a warning is issued.

In the warning table Tk, the warning time period is set for each warning ID and each user ID. That is, by using the warning table Tk, the storage unit 110 manages the warning time period for each of the plurality of warnings for each user.

In the warning table Tk, the warning time period as an initial value is set for each warning ID. In the illustrated warning table Tk, the warning time period at the row of which the user ID is "-" is the initial value. As described above, the warning table Tk illustrated in FIG. 16 has a data structure similar to that of the message table Tm illustrated in FIG. 11.

Referring back to FIGS. 14 and 15, in a case where the original document is not removed (No in step S506), the main control unit 130 refers to the storage unit 110 and acquires the warning time period corresponding to the warning ID and the user ID acquired the main control unit 130 in the warning table Tk (step S510). In a case where the user is not authenticated, the main control unit 130 returns the time period of which the user ID in FIG. 16 is "-".

Next, the main control unit 130 determines whether or not the warning time period acquired by the warning timer is exceeded (step S511). As a result, in a case where the warning time period is not exceeded (No in step S511), the processing returns to step S506. On the other hand, in a case where the warning time period is exceeded (Yes in step S511), the main control unit 130 issues warning, for example, by voice (step S512). For example, this warning notifies the user that the original document is not removed. Further, a warning message may be displayed on the operation panel 15 in place of the voice or together with the voice.

As described above, in the third embodiment, the storage unit 110 manages a warning time period for issuing a warning to the user about forgetting to take an original document out of the image reading unit 16 through a message. The main control unit 130 sets the warning time period at the timing at which the user removes the original document from the image reading unit 16. Further, in the third embodiment, the main control unit 130 functions as a setting unit that sets the warning time period on the basis of the operation of the user.

In the third embodiment, the main control unit 130 sets, as the warning time period, a time period from when the reading of the original document is completed to when the user removes the original document. In a case of removing the original document, there are differences among individuals such as a user who removes the original document at the time at which the reading of the original document is completed and a user who does not remove the original document until the copying or the like is completed. Then, in a case where the warning time periods until the warning of forgetting to take the original document out are uniformly set, individual differences among users are not taken into consideration. As a result, the user may feel bothersome such as being warned even though the user is willing to remove the original document. In the present embodiment, the warning time period is managed in consideration of these individual differences. Then, a warning is capable of being issued to each user at a more appropriate timing. As a result, it is possible to prevent the user from forgetting to take the original document out, and the user is less likely to feel bothered.

Description of Program

Here, the processing performed by the control unit 100 in the present embodiment described above is provided, for example, as a program such as application software. Then, the processing performed by the control unit 100 is implemented through cooperation of software and hardware resources.

Accordingly, in the present embodiment, the program that executes the processing performed by control unit 100 is capable of being regarded as a program causing a computer to implement the following functions: a management function of managing a display time period of each of a plurality of messages when displaying the message on the operation panel 15 for each user; a setting function of setting the display time period on the basis of an operation of a user; and a control function of controlling display of the message on the basis of the display time period managed by the management function.

In the example described above, the exemplary case where the present invention is applied as a display control device to the image forming apparatus 10 has been described, but the present invention is not limited to this. That is, the present embodiment is capable of being applied to any device that displays or voices a message. For example, the present invention may also be applied to mobile terminals such as mobile phones, smartphones, and tablets, and navigation devices such as car navigation devices.

The program for realizing the present embodiment is capable of being provided not only by communication unit but also by being stored in a recording medium such as a CD-ROM.

Although the present embodiment has hitherto been described, the technical scope of the present invention is not limited to the scope described in the above-mentioned embodiments. It is apparent from the scope of the claims that the technical scope of the present invention includes the embodiments described above with various modifications or improvements.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
    a memory that manages, for each user, a display time period of each message of a plurality of messages to display on a display device;
    a processor, configured to:
        set, the display time period on the basis of an operation of a user;
        control display of an interface for operation, wherein the interface for operation accepts an operation input issued from a user; and
        control display of a message which is superimposed on at least a part of the interface for operation on the basis of the display time period, wherein the part of the interface for operation superimposed by the message is not able to accept the operation input issued from the user.

2. The display control device according to claim 1, wherein the processor sets, as the display time period, a time period from when the display of the message is started to when the user performs a predetermined operation.

3. The display control device according to claim 2, wherein the processor dismisses the message in response to the user performing the predetermined operation.

4. The display control device according to claim 1, wherein the processor sets the display time period in accordance with a state of authentication of the user.

5. The display control device according to claim 4, wherein the processor sets, as the display time period, a time period, which is shorter than a predetermined longest time period and longer than a predetermined shortest time period, in a state where the user is authenticated.

6. The display control device according to claim 5, wherein the processor sets the longest time period as the display time period in a state where the user is not authenticated.

7. The display control device according to claim 5, wherein the processor determines whether or not to change the display time period in a state where the user is not authenticated.

8. The display control device according to claim 7, wherein the processor does not change the display time period in a case where a device to be authenticated is used by more than one person.

9. The display control device according to claim 4, wherein the processor sets the display time period in accordance with a frequency of authentication of the user.

10. The display control device according to claim 9, wherein the processor sets the display time period in accordance with a period from the last authentication of the user.

11. A display control system comprising:
a display device that displays a message and an interface for operation; and
a display control device that controls the display of the message,
wherein
the display control device includes
a memory that manages a display time period when displaying each of a plurality of the messages on the display device for each user, and
a processor, configured to:
set the display time period on the basis of an operation of a user;
control display of the interface for operation, wherein the interface for operation accepts an operation input issued from a user; and
control display of the message which is superimposed on at least a part of the interface for operation on the basis of the display time period, wherein the part of the interface for operation superimposed by the message is not able to accept the operation input issued from the user.

12. An image forming apparatus comprising:
a printer that forms an image on a recording material;
a memory that manages a time period for notifying each of a plurality of messages when notifying each user of the message relating to the image forming apparatus for each user;
a processor, configured to:
set the time period on the basis of an operation of a user;
control display of an interface for operation, wherein the interface for operation accepts an operation input issued from a user; and
control display of the message which is superimposed on at least a part of the interface for operation on the basis of the time period, wherein the part of the interface for operation superimposed by the message is not able to accept the operation input issued from the user.

13. The image forming apparatus according to claim 12, further comprising
a display device that displays information about the image forming apparatus,
wherein the processor manages the display time period of the message when displaying the message on the display device, and sets the display time period on the basis of the operation of the user.

14. The image forming apparatus according to claim 12, further comprising
an image sensor that reads an image of an original document,
wherein the memory manages a time period for notifying the user of forgetting to take an original document out of the reading unit through the message, and
wherein the processor sets the time period in accordance with timing at which the user removes the original document from the image sensor.

* * * * *